Dec. 17, 1963 A. THOMAS 3,114,837
APPARATUS FOR PROVIDING AUDIBLE INDICATION OF RADIOACTIVITY
Filed Sept. 28, 1959 2 Sheets-Sheet 1

INVENTOR.
Alexander Thomas
BY
Joseph Weingarten
Attorney

Dec. 17, 1963 A. THOMAS 3,114,837
APPARATUS FOR PROVIDING AUDIBLE INDICATION OF RADIOACTIVITY
Filed Sept. 28, 1959 2 Sheets-Sheet 2

INVENTOR.
Alexander Thomas
BY
Joseph Weingarten
Attorney

United States Patent Office 3,114,837
Patented Dec. 17, 1963

3,114,837
APPARATUS FOR PROVIDING AUDIBLE
INDICATION OF RADIOACTIVITY
Alexander Thomas, Needham, Mass., assignor, by mesne assignments, to Laboratory For Electronics, Inc., Boston, Mass., a corporation of Delaware
Filed Sept. 28, 1959, Ser. No. 842,742
3 Claims. (Cl. 250—83.3)

This invention relates in general to radiation monitoring and more particularly to a novel alarm system for detecting undesirably high levels of radiation.

The probability of radioactivity fallout contaminating large areas and creating dangerously high radiation dosages has created a need for simple, reliable and economical warning devices which can be operated by the general public. While it is well known that there are a multitude of devices used in professional laboratories and industry, which are capable of detecting and indicating radiation dosages, these instruments are complex and expensive when considered from the standpoint of general public use. Into this category fall not only the precision instruments containing Geiger and scintillation counters and ionization chambers which are used in research laboratories, but also the more rugged and, by comparison, simple instruments used for surveying radioactive ore deposits. This latter group of survey instruments is available only at a cost which is prohibitive in terms of an instrument for the public at large.

Broadly speaking the present invention provides a compactly packaged, inexpensive radiation detector capable of being incorporated at relatively small expense into available household electronic apparatus, such as radio or television receivers, high fidelity sets and the like. In the subsequent discussion, reference will be made only to radios, it being understood that the principles herein disclosed are equally applicable to other electronic household devices. The addition of this invention to a radio can be done either as a further step in the initial manufacturing process, or by the home user himself in adapting previously purchased electronic apparatus. The detector of this invention is sensitive to harmful radiation levels and acts in such a manner that the frequency of an oscillator output increases as the radiation field at the detector increases. The oscillator output is coupled either directly to the speaker of a radio or through the amplification system in a radio to the speaker. The alarm system can be operated either from an independent power supply, such as a battery, or by means of the available radio voltage supply. In the former case (that is, where the detector-oscillator is coupled directly to the speaker of the radio) the device has the characteristic that the warning apparatus operates at all times, even when the radio itself is switched off. The device may be arranged so that at the normal radiation background, attributable to cosmic rays, natural radioactivity and electrical leakage at the detector, the only sound produced is an intermittent click indicating a state of readiness; or the device may be rendered wholly silent under such conditions. As the radiation field, due for example to radioactive fallout after an atomic blast, increases to a dangerous level the frequency presented at the loudspeaker increases and the loudspeaker provides a high-pitched wail with increasing frequency as the radiation level further increases. This warning device when incorporated into automobile or portable radios can also serve as an indicator to show which areas are at "safe" radiation level. Thus when the automobile radio or portable radio arrives in an area where the radiation level is once more reduced to a nondangerous level, the pitch of the warning output will decrease substantially, thereby indicating this condition.

It is therefore a primary object of this invention to provide a compact, economical, reliable radiation warning system.

It is another object of this invention to provide a simple, economical radiation warning system which may be readily incorporated into electronic appliances of the type normally found in household use.

It is still another object of this invention to provide a radiation warning system which produces an audible warning signal proportional to the radiation level and requires extremely little standby power drain.

These and other objects and advantages will become apparent from the following detailed description when taken in conjunction with the accompanying drawing in which.

Figure 1:
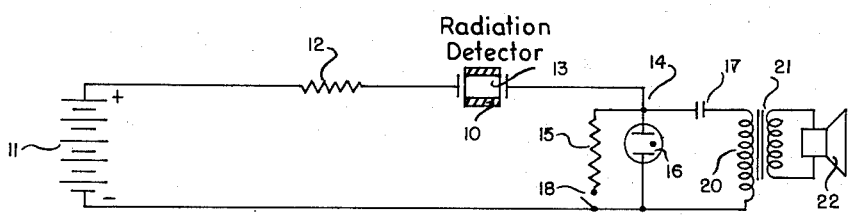
FIG. 1 is an illustration in schematic form of the apparatus of this invention.

With reference now to FIG. 1, the alarm system of this invention is seen to comprise a relaxation oscillator having a radiation detector 13 as its frequency controlling element, coupled through a transformer 21 to an output audio loudspeaker 22. The relaxation oscillator includes the above-mentioned radiation detector 13, as well as neon discharge tube 16 and storage capacitor 17. The radiation detector element 13 is serially connected with neon discharge tube 16 across a voltage source 11, which in this instance is diagrammed as a battery. The primary winding 20 of transformer 21 is coupled through capacitor 17 to neon tube 16. A resistor 12 inserted between the radiation detector element 13 and voltage source 11 serves to protect the remainder of the circuit components from any excessive current drain. A switch 18 in series with resistor 15 across neon discharge tube 16 serves, in a manner to be described below, as a calibrating means for the alarm system. Neon discharge tube 16 and capacitor 17 may be interchanged without in any way affecting the operation of the circuit.

As previously indicated, the overall function of the relaxation oscillator is to provide a siren-like wail through audio speaker 22 above a predetermined value of incident radiation; the frequency of the speaker output increasing with an increase in this radiation field, remaining however within the audible range. The frequency output of the relaxation oscillator shown is determined by the value of the capacitor 17 together with the resistance of radiation detector 13 in series with resistor 12 for a particular neon tube. Resistor 12 is of relatively low value in comparison with the resistance of detector 13; hence, the frequency is primarily dependent upon the choice of capacitor 17 and the resistance of detector 13 at any given radiation field. Detector 13 may be any suitable radiation detector which provides an impedance decreasing with increasing intensity of radiation field, a good example being a cadmium sulfide crystal. A limiting factor on the choice of value of capacitor 17 arises from the fact that the time constant composed of capacitor 17 and the input impedance of transformer 21 must be long enough to minimize loss of electrical energy at supersonic frequencies. Thus, on the one hand it is desirable to have a high value of the product of the capacitor 17 value times the effective input resistance of transformer 21, while on the other it is desirable to have a small value of the product of the resistance of detector 13 times capacitor 17, since this results in a higher frequency response at a given radiation level. The effective input resistance across primary winding 20 is therefore selected to be as high as is feasible in order to develop a full signal and thus achieve maximum output level from speaker 22. It then also becomes a design criterion of detector 13 that its impedance at any given radiation field be sufficiently low to provide a relatively high audio frequency output when operated in conjunction with available loudspeaker transformers.

As described above, switch 18 serves primarily as a calibration switch enabling circuit operation to be checked as well as a correlation to be made between a particular frequency output and the corresponding radiation field impingent upon detector 13. This is accomplished by means of applying a radioactive coating 10 to the outside of radiation detector 13 which provides an ascertainable amount of impingent radiation on the detector 13 and when switch 18 is disconnected from resistor 15 a frequency corresponding to this field value will be observed at the loudspeaker. The value of resistor 15 is chosen to be such that when it is coupled through switch 18 into the circuit the voltage divider formed by this resistor in series with the resistance of detector 13 decreases the potential across neon tube 16 below the discharge point when there is no external radiation field. However, when the switch 18 is opened, the divider action does not take place and, provided that the current is sufficient, a voltage is built up which does fire the neon tube at a frequency determined by the time constant composed of capacitor 17 and the resistance of detector 13. The resistance of detector 13 is determined to some extent by the amount of radioactivity coated on it; hence, when switch 18 is opened in a very low external radiation field, the frequency output is determined by amount of coated radioactivity, and a calibration for the entire circuit is provided. For normal operation, switch 18 would remain closed, thus shunting resistor 15 across the neon tube 16 and thereby establishing a minimum radiation level which will give rise to any audio output.

In a specific example, a field of radiation at which it might be desirable to provide an alarm would be ten roentgens per hour. Typically, a cadmium sulfide crystal under this field condition would have an impedance in the order of $1.5 \times 10^7$ ohms. Thus, with a value for capacitor 17 of 2,000 micromicrofarads, a signal having a frequency of thirty-three cycles per second for this radiation field is produced. For a cadmium sulfide crystal of dimensions 2 x 2 x .35 mm., a radium source of .057 microcurie will provide a one count per second calibration rate. A suitable value for resistor 15 is 800 megohms.

Figure 2:
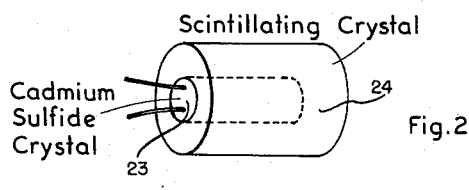
FIG. 2 is a perspective view of the detail of one embodiment of the sensing element of this invention.

Turning now to FIG. 2, there is shown in perspective view one embodiment of the radiation detector employed in this invention. A cadmium sulfide crystal 23 is shown imbedded in a scintillating crystal 24. Cadmium sulfide crystals have the property that their direct current resistance decreases when they are exposed to radiation. These crystals exhibit the same characteristic in response to visible light, so that in order to provide response only to radiation, they must be light sealed. The crystal itself, when it is not imbedded in scintillating material, or the overall package when a scintillator is used must be enveloped in a light-tight coating. The scintillating crystal may be any radiation sensitive scintillator delivering light of wave length to which the cadmium sulfide photoconductor is sensitive, thallium activated cesium iodide being a suitable example. In order to obtain maximum efficiency the outer surface of the scintillating crystal should be specularly or diffusely reflective as well as opaque to external light. An aluminum coating on the entire outside surface of the crystal followed by a coating of black lacquer has been successfully employed. The use of the scintillation package increases the efficiency of the detector considerably in that it has a larger volume with which the radiation can interact and thus renders the cadmium sulfide response more sensitive to any given radiation field.

Figure 3:
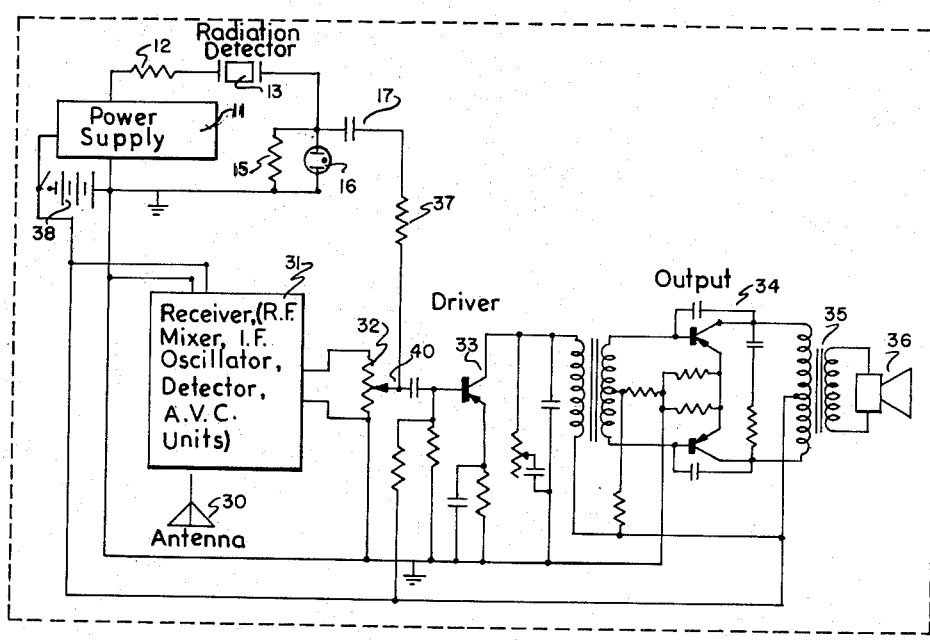
FIG. 3 is an illustration in schematic form of the warning device of this invention incorporated into a portable transistor radio receiver.

With reference specifically to FIG. 3 there is shown the detector and oscillator of this invention incorporated into a transistor radio circuit. The transistor radio may be of any conventional design, the circuit shown being selected as a typical one. For example, the input of the radio receiver is seen to be an antenna 30 coupled into the radio receiver circuits 31, which consist of the RF, mixer, oscillator, IF, detector and AVC stages. The output of the preceding sections is presented across volume control potentiometer 32 which is capacitively coupled to the driver stage 33, which in turn is transformer coupled to the output stage 34. The output stage is coupled to loudspeaker 36 by means of output transformer 35. The power for the radio receiver is supplied by batteries 38. The radiation warning section again consists of the power supply 11, which may be either separate batteries or a step-up power supply of the transistor oscillator or vibrator type supplying an output potential in the order of two to three hundred volts. A limiting resistor 12 is coupled in series from one terminal of the power supply to radiation detector 13, the other terminal of which is returned to the second terminal of the power supply 11 directly through neon tube 16, which in this case has a shunt resistor 15 across it. The second terminal of radiation detector 13 is also coupled through capacitor 17 in series with resistor 37 to the movable tap 40 of potentiometer 32. The movable tap 40 serves as the input point to the driver and output stages of the radio set. In this embodiment the frequency of the radiation oscillator is again determined by the impedance of detector 13 and capacity of capacitor 17. The series resistor 38 which now appears in series with the tapped portion of potentiometer 32 to ground serves as voltage divider, which attenuates the warning signal to a level that can be handled by the driver stage without overloading it. In this model the warning system utilizes the audio amplification and speaker units, which form an integral part of the radio itself, to provide a sound amplification system. The size of the components which constitute the radiation warning section is small and can be compactly arranged to be included within the normal case of a typical transistor radio. The component parts of the radiation warning system are also inexpensive. It thus becomes possible to modify almost any transistor radio to serve in addition as a radiation warning device, at very low cost.

Figure 4:
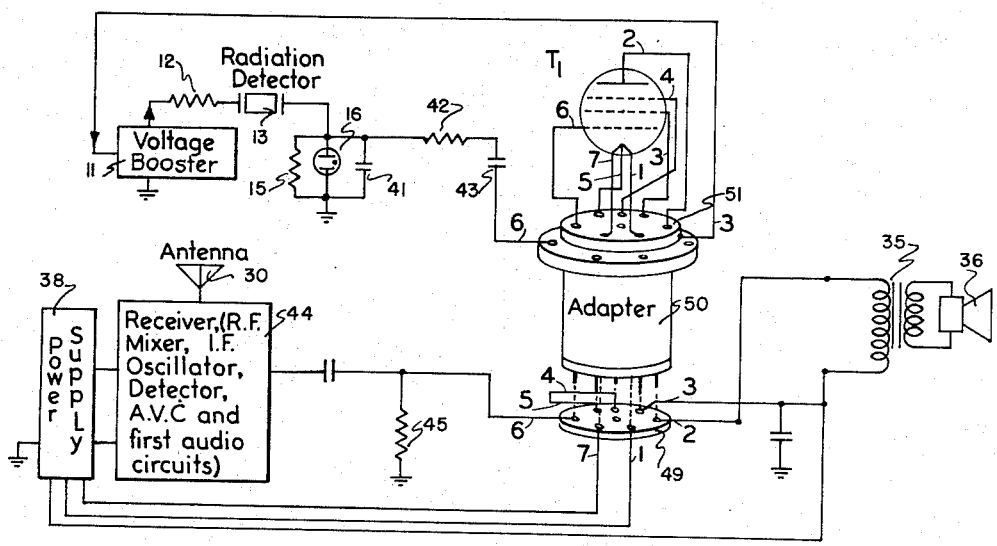
FIG. 4 is an illustration partly in perspective and partly in schematic form of an embodiment of this invention in which the warning device is incorporated through an adapter into a vacuum tube radio receiver.

A vacuum tube radio may also be adapted to serve as a radiation warning device. With reference now to FIG. 4 there is illustrated partly in schematic and block diagram form and partly in perspective a vacuum tube radio incorporating the warning system of this invention in which like numbers refer to like parts of the previous figures. A conventional antenna 30 provides the input to the front end of the radio receiver set 44 which is provided with power by power supply 38. This power supply would generally consist of batteries plus a step-up circuit in order to provide the requisite high voltage for vacuum tube operation. The front end 44 of the receiver would include the receiver unit, consisting of RF, mixer, IF, oscillator, detector, AVC, and first audio circuits. For operation of the radio this unit must be coupled to the output audio stage $T_1$ and hence to speaker coil 35 driving speaker 36. In the standard radio receiver the ouput audio stage $T_1$ would normally be plugged into tube socket 49. One form, which can readily be used by the home radio owner, for modification of such a radio to include the warning device, is to provide the warning circuit packaged in an adapter 50 which itself plugs into the tube base 49 and provides a second tube base 51 on the adapter, into which tube $T_1$ may be plugged. This adapter may be of a conventional type in that it connects the pins of the original tube base 49 to its own tube base 51, but also makes these connections available to the auxiliary plug-in circuit. The radiation warning detector-oscillator might well be contained within the physical form of the adapter itself and be of a size comparable to a standard vacuum tube.

The warning device is again seen to be powered by a booster voltage supply 11 which, in this case, may take the form of a vibrator converter operating off the B+ potential in the radio set. To accomplish this it may be connected, within the adapter, to pin 3 which also supplies the screen grid of tube $T_1$. If the screen voltage is sufficient, the voltage booster supply may be omitted. In this event, a direct connection is made between pin 3 and one side of circuit protective resistor 12. Although it is not so pictured in the diagram, the booster voltage could also be furnished by a transistor oscillator supply powered from the filament voltage of the radio set, which of course is also present in the adapter connections. In FIG. 4 one side of the detector 13 is again returned through a neon discharge tube 16 with a shunt resistor 15 directly to ground. Here, however, the time constant and hence frequency controlling capacitor 41 is coupled directly from the second terminal of the radiation detector to ground. Its value is again determined by the optimum frequency output desired for any particular resistive value of the radiation detector 13. This signal is coupled through series resistor 42 and series capacitor 43 to the control grid of $T_1$ through the connection pin 6 on the adapter. The path to ground is completed through the grid resistor 45 within the radio circuit. The values of resistor 42 and capacitor 43 are selected to be such that the time constant is longer than the duration of the oscillator pulse, which is the discharge time of the neon tube 16 and generally in the order of 25 to 50 microseconds; resistors 42 and 45 form a voltage divider, and by varying the values of these resistors the amplitude of the signal coupled into audio tube $T_1$ can be controlled. From $T_1$ the signal is coupled into the transformer 35 and output speaker 36.

Figure 5:
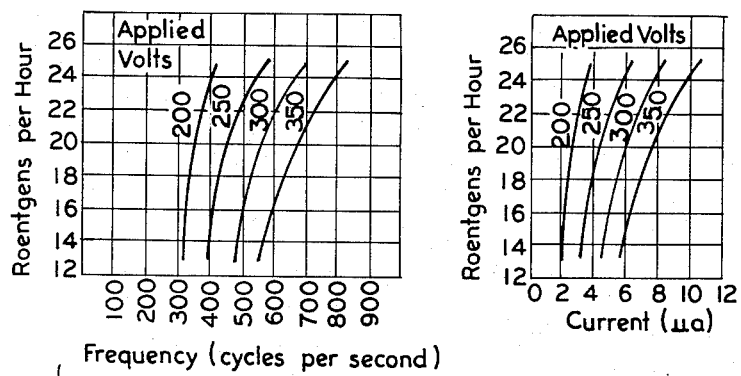
FIG. 5 is a plot indicating the frequency and current response as a function of radiation field of the apparatus of this invention for different applied voltages.

In FIG. 5 there is shown a plat of frequency versus roentgens per hour and current versus roentgens per hour for the circuit as shown in FIG. 4. Resistor 45 had a value of 1 megohm, resistor 42 was 3.3 megohms, capacitor 41 was 60 micromicrofarads, and capacitor 43 had a value of 25 micromicrofarads. The curves shown are for different values of applied voltage. This voltage is the full voltage applied across the circuit at power supply 11. Tube 16 was an NE-96 neon glow tube. It will be understood that the frequency response is to some extent a matter of design choice. It must operate in the audio region; however, the radiation level at which the high pitched wail commences may be determined by controlling the value of capacitor 41 in the oscillator circuit. Resistor 15 which serves as a leak resistor across the neon tube may be omitted altogether if it is desired to produce individual clicks on background radiation and leakage current. On the other hand, if it is desired that no signal at all be produced until the radiation rises above a particular level, the value of resistor 15 is selected such that its value is somewhat lower than the resistance of radiation detector 13 at radiation fields below this level, thus preventing sufficient potential from being developed across the neon tube to initiate discharge. A suitable value for resistor 15 in this circuit is 400 megohms.

Figure 6:
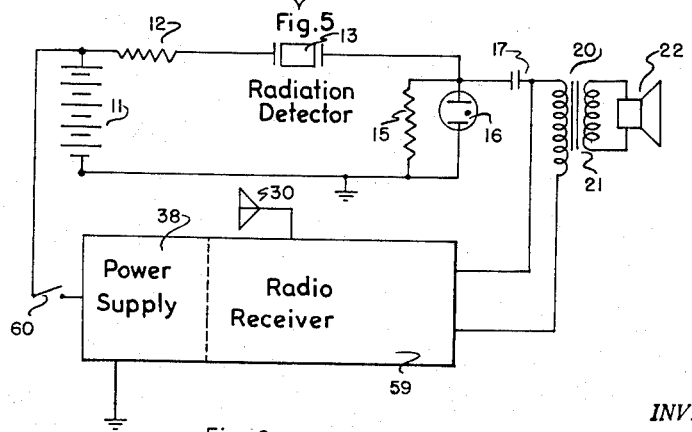
FIG. 6 is an illustration partly in schematic and partly in block diagram form of an embodiment of this invention in which the warning device is coupled directly to the speaker of a radio receiver.

With reference now specifically to FIG. 6 the warning device of this invention is illustrated partly in schematic and partly in block diagram form, like numbers referring to like parts of the previous figures. The radiation warning device is shown incorporated into a typical portable radio in such a manner that the warning device is operating independently of the operation of the radio itself.

Thus, the detector oscillator circuit has high voltage applied at all times from power supply 11 and the output of capacitor 17 is coupled directly across the primary coil of transformer 21 driving output speaker 22. The radio receiver set 59 may derive its power from supply 11 also; however, it is developed into the necessary values for the receiver set in power supply 38 which is coupled by means of on-off switch 60 to supply 11. While in FIG. 6 the circuit is shown coupling the radiation warning circuit directly to the speaker transformer 21, an alternate means for accomplishing this would be to provide a separate speaker transformer (not shown) coupled across the speaker 22 in parallel with transformer 21. This arrangement would be most suitable when the impedance of the existing radio transformer is not sufficiently high to allow the frequency controlling capacitor 17 to be small enough to provide the desired high frequency output.

In the circuit shown in FIG. 6 a 300 volt applied voltage across the detector oscillator circuit yielded satisfactory results with the particular cadmium sulfide detector used and the drain on the power supply from normal background operation was in the order of 33 microwatts, which does not seriously affect the shelf life of a normal battery supply.

The radiation warning device of this invention has been described above for the most part in terms of incorporation into home radio receiver sets. While it has not previously been emphasized, the invention applies equally well to automobile and military radio sets. Thus in the former case perhaps the major advantage of such a system would be to inform the listener when an area in which the radiation dosage level was "safe" had been reached. In the latter case, that of military radios, the advantages in terms of nuclear warfare and civilian protection need no elaboration. The warning system might also be incorporated into other electronic equipment, utilizing the availability of the power supply and/or loudspeaker already present. From the foregoing it is obvious that many modifications and improvements may now be made by those skilled in the art and the invention disclosed herein should be construed as limited only by the spirit and scope of the appended claims.

What is claimed is:

1. A radioactivity warning device providing an audible signal characterized by having a frequency with varies in accordance with the intensity of radiation present, comprising a free-running oscillator formed of a nuclear radiation sensitive element, whose conductivity varies with radiation incident thereon; an electron discharge device; a capacitor; a loudspeaker transformer; a loudspeaker; a source of direct current voltage, said radiation sensitive device being coupled in serial combination with said electron discharge device across said source of direct current voltage, said capacitor and the primary winding of said transformer being coupled in series across said electron discharge device, said loudspeaker being coupled across the secondary winding of said transformer, said capacitor in said oscillator being selected to provide an audible frequency output from said loudspeaker at a predetermined value of incident radiation.

2. A radioactivity warning device providing an audible signal characterized by having a frequency which varies in accordance with the intensity of radiation present, comprising a free-running oscillator formed of a radiation sensitive element, whose conductivity varies with radiation incident thereon; an electron discharge device; a capacitor; a loudspeaker coupling transformer; a loudspeaker; a source of direct current voltage, said radiation sensitive device being coupled in serial combination with a parallel combination of said electron discharge device, said capacitor and the primary winding of said loudspeaker transformer across said direct current voltage source, said loudspeaker being coupled across the secondary winding of said transformer, said capacitor in said oscillator being selected to provide an audible frequency output from said loudspeaker at a predetermined value of incident radiation.

3. Conventional electronic apparatus such as a radio, high fidelity system, television receiver or the like having a loudspeaker and a source of direct current voltage, in combination with a nuclear radiation sensitive element, whose conductivity varies with radiation incident thereon; an electron discharge device; a capacitor, said radiation sensitive element, said electron discharge device and said capacitor being connected with said direct current voltage source to form a relaxation oscillator having a frequency dependent on the intensity of nuclear radiation incident on said radiation sensitive element, said oscillator output being coupled to said loudspeaker in said conventional electronic apparatus, said oscillator being arranged to provide at the nuclear radiation intensity level normally present an intermittent audible signal, whereby an indication of normal radiation intensity and circuit operation is provided.

References Cited in the file of this patent

UNITED STATES PATENTS

| | | |
|---|---|---|
| 2,703,367 | Florman | Mar. 1, 1955 |
| 2,706,790 | Jacobs | Apr. 19, 1955 |
| 2,728,861 | Glass | Dec. 27, 1955 |
| 2,738,432 | Satio | Mar. 13, 1956 |
| 2,820,147 | Dennis | Jan. 14, 1958 |
| 2,839,678 | De Witz | June 17, 1958 |
| 2,858,448 | Brown et al. | Oct. 28, 1958 |
| 2,874,305 | Wilson et al. | Feb. 17, 1959 |
| 2,899,560 | Nemet | Aug. 11, 1959 |
| 2,957,081 | Chapman | Oct. 18, 1960 |

OTHER REFERENCES

Schafer: The Use of Standard Broadcast Receivers as Radioactive Indicators, A.E.C.D. 2310, L.A.D.E. 554; declassified Sept. 21, 1948.

Fried: The Prospector's Partner, Popular Mechanics, March 1957, pages 161 to 164 and 229 to 232.

Spear: Transistorized Radiation Survey Instruments, Nucleonics, June 1957, page 100.